(12) United States Patent
Belser et al.

(10) Patent No.: US 11,259,160 B1
(45) Date of Patent: Feb. 22, 2022

(54) PROVISIONING A VOICEMAIL PLATFORM

(71) Applicant: T-MOBILE INNOVATIONS LLC, Overland Park, KS (US)

(72) Inventors: John E. Belser, Olathe, KS (US);
Mark Douglas Peden, Paola, KS (US);
Raymond E. Reeves, Oviedo, FL (US);
Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 53 days.

(21) Appl. No.: 16/913,929

(22) Filed: Jun. 26, 2020

(51) Int. Cl.
| | |
|---|---|
| *H04W 4/50* | (2018.01) |
| *H04W 4/12* | (2009.01) |
| *H04W 8/26* | (2009.01) |
| *H04M 3/533* | (2006.01) |
| *H04W 4/60* | (2018.01) |

(52) U.S. Cl.
CPC .............. *H04W 4/50* (2018.02); *H04M 3/533* (2013.01); *H04W 4/12* (2013.01); *H04W 4/60* (2018.02); *H04W 8/26* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,572,578 | A * | 11/1996 | Lin | H04M 3/53316 379/235 |
| 7,085,554 | B2 * | 8/2006 | Picard | H04M 3/53325 379/88.18 |
| 7,912,497 | B2 * | 3/2011 | Isidore | H04W 8/26 455/552.1 |
| 8,116,744 | B1 * | 2/2012 | Mikan | H04M 3/5335 455/413 |
| 8,295,814 | B2 * | 10/2012 | Esteve Balducci | H04W 4/12 455/412.1 |
| 8,805,445 | B1 * | 8/2014 | Gailloux | H04W 4/24 455/558 |
| 10,542,395 | B2 * | 1/2020 | Backhaus | H04M 3/54 |
| 2004/0264657 | A1 * | 12/2004 | Cline | H04M 3/53325 379/88.22 |
| 2005/0075106 | A1 * | 4/2005 | Jiang | H04W 8/18 455/432.3 |

(Continued)

*Primary Examiner* — Steven S Kelley

(57) ABSTRACT

A computer system for provisioning voicemail. The system comprises a processor, a non-transitory memory, and a voicemail provisioning application. Upon execution by the processor, the provisioning application receives a request to create a voicemail account associated with a first phone number, creates a voicemail account comprising a first voicemail box, assigns a voicemail account identifier associated with an identity of the subscriber, and transmits the voicemail account and first voicemail box to a voicemail system, wherein the voicemail account identifier is used to reference the voicemail account. The application further receives a request to create a voicemail account associated with a second phone number of the mobile communication device, determines that a voicemail account associated with the mobile communication device already exists, creates a second voicemail box, and transmits the second voicemail box to the voicemail account identified by the voicemail account identifier.

19 Claims, 7 Drawing Sheets

(56) References Cited

U.S. PATENT DOCUMENTS

| | | | | |
|---|---|---|---|---|
| 2005/0111635 A1* | 5/2005 | Caputo | ............... | H04M 3/533 |
| | | | | 379/88.22 |
| 2005/0117731 A1* | 6/2005 | Pearson | ............... | H04M 3/54 |
| | | | | 379/211.02 |
| 2009/0003555 A1* | 1/2009 | Emerson | ............... | H04M 3/533 |
| | | | | 379/88.23 |
| 2009/0245486 A1* | 10/2009 | Lingafelt | ............... | H04M 3/533 |
| | | | | 379/88.23 |
| 2009/0262910 A1* | 10/2009 | Scopes | ............... | H04M 3/533 |
| | | | | 379/88.25 |
| 2010/0056142 A1* | 3/2010 | Ricci | ............... | H04W 84/042 |
| | | | | 455/435.1 |
| 2011/0069825 A1* | 3/2011 | Rogson | ............... | H04M 3/436 |
| | | | | 379/142.06 |
| 2014/0273980 A1* | 9/2014 | Regan | ............... | H04Q 3/0062 |
| | | | | 455/413 |
| 2016/0381226 A1* | 12/2016 | Messenger | ............... | H04M 3/465 |
| | | | | 455/413 |

\* cited by examiner

PROVISIONING A VOICEMAIL PLATFORM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Voicemail systems provide consumers with flexibility in managing incoming phone calls in that they provide a mechanism for handling messages from the calling party in instances where the receiving party is not able to answer the call or misses the call. Voicemail systems record and store voice messages from the calling party and alleviate the necessity that both the calling and receiving party be available and participate in the phone call. The party who receives that phone call and the voicemail message may listen to the recorded message whenever a convenient time arises. After listening to the voicemail message, the receiving party may opt to re-listen, save, or delete the voicemail message from the voicemail inbox. Many voicemail systems also have a feature that allows the receiving party to call back the phone number of the individual who left the message.

SUMMARY

In an embodiment, a computer system for provisioning voicemail service to a mobile communication device is disclosed. The system comprises a processor, a non-transitory memory coupled to the processor, and a voicemail provisioning application stored in the non-transitory memory. When executed by the processor, the voicemail provisioning application receives a request to create a voicemail account associated with a first phone number of a mobile communication device of a subscriber, creates a voicemail account comprising a first voicemail box for the first phone number, assigns a voicemail account identifier associated with an identity of the subscriber to the voicemail account, and transmits the voicemail account and the first voicemail box to a voicemail system on the network, wherein the voicemail account identifier is used to reference the voicemail account. The voicemail provisioning application further receives a request to create a voicemail account associated with a second phone number of the mobile communication device, determines that a voicemail account associated with the identity of the subscriber already exists on the voicemail system, creates a second voicemail box associated with the voicemail account, wherein the second voicemail box comprises a reference to the voicemail account identifier, and transmits the second voicemail box to the voicemail account identified by the voicemail account identifier.

In another embodiment, a method of provisioning voicemail service to a mobile communication device is disclosed. The method comprises receiving, by a voicemail provisioning application executing on a processor of a voicemail provisioning server, a request to create a voicemail account associated with a first phone number of a mobile communication device of a subscriber, creating a voicemail account comprising a first voicemail box for the first phone number by the voicemail provisioning application, assigning a voicemail account identifier associated with an identity of the subscriber to the voicemail account by the voicemail provisioning application, and transmitting the voicemail account and the first voicemail box to a voicemail system on the network by the voicemail provisioning application, wherein the voicemail account identifier is used to reference the voicemail account. The method further comprises receiving, by the voicemail provisioning application, a request to create a voicemail account associated with a second phone number of the mobile communication device, determining that a voicemail account associated with the identity of the subscriber already exists on the voicemail system by the voicemail provisioning application, creating a second voicemail box associated with the voicemail account by the voicemail provisioning application, wherein the second voicemail box comprises a reference to the voicemail account identifier, and transmitting the second voicemail box to the voicemail account identified by the voicemail account identifier by the voicemail provisioning application.

In yet another embodiment, a method of provisioning and managing voicemail service to a mobile communication device is disclosed. The method comprises creating, by a voicemail provisioning application executing on a processor of a voicemail provisioning server, a voicemail account comprising a voicemail box for a phone number, wherein the voicemail account is associated with a subscriber account, assigning a voicemail account identifier associated with an identity of the subscriber to the voicemail account by the voicemail provisioning application, and transmitting the voicemail account and the voicemail box to a voicemail system on the network by the voicemail provisioning application, wherein the voicemail account identifier is used to reference the voicemail account. The method further comprises evaluating, by the voicemail provisioning application, the voicemail account for an active subscriber account and based on the evaluation that the voicemail account is not associated with an active subscriber account on the voicemail account, deleting the voicemail account from the voicemail system by the voicemail provisioning application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
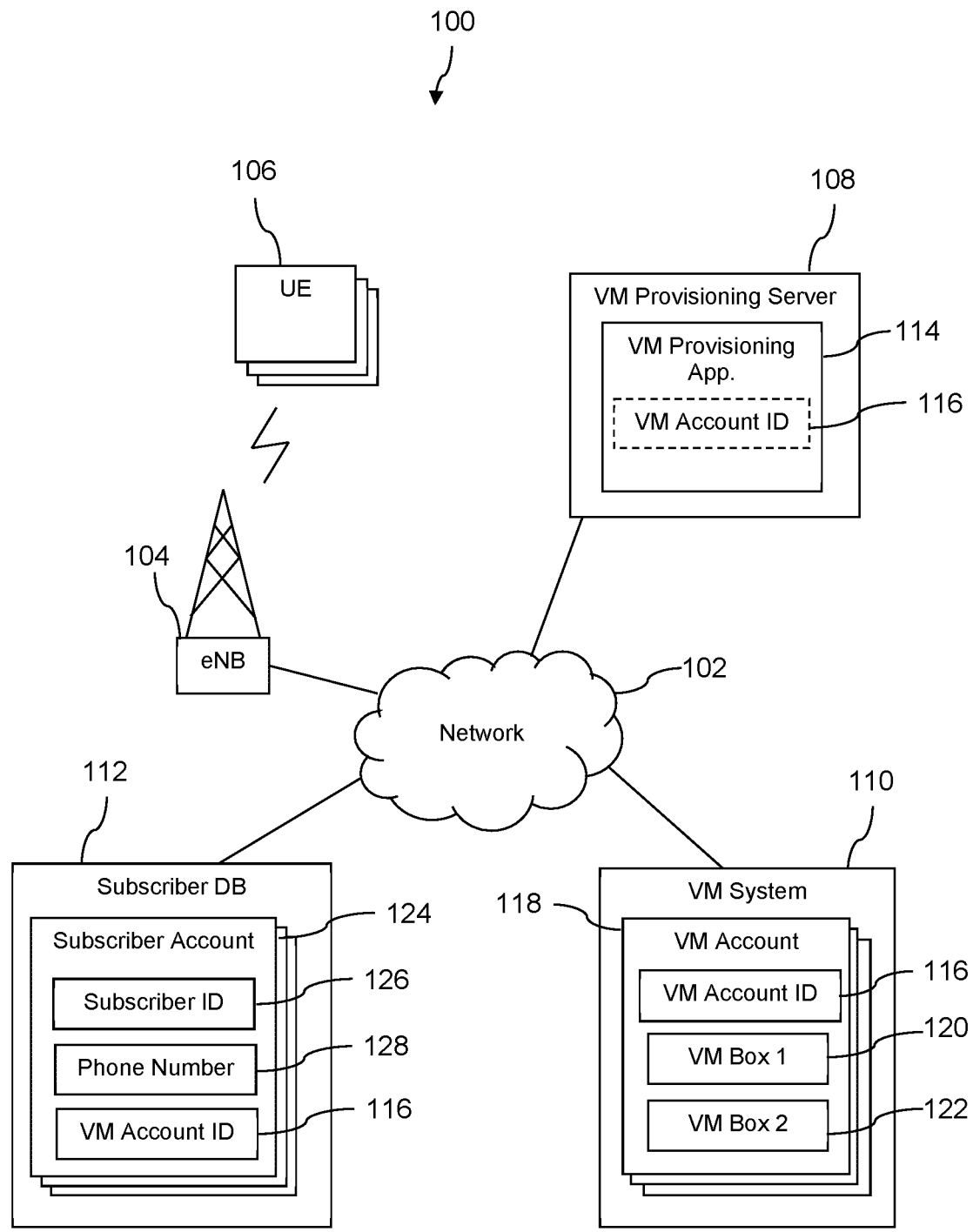
FIG. 1 is a block diagram of a voicemail provisioning system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Voicemail exists as a feature on many cellular service plans for mobile communication devices. Subscribers of service providers may set up voicemail functions on their mobile communication device when establishing a new cellular plan on a new phone number or while continuing to use an existing phone number, where the subscriber may be switching from one service provider to another. Voicemail allows a caller to leave a voice message when the party being called does not answer the phone call. After a certain length of time has passed of not answering the call, the service provider may route the call to a voicemail system that includes a virtual "mailbox" assigned to the subscriber, at which point the caller may leave an audio message. Voicemail messages may be stored in a network server of the service provider, and the receiving party may retrieve and listen to the voicemail messages at his or her convenience. Voicemail systems often have security mechanisms to access a voicemail box, where a user may be prompted to enter a password or personal identification number (PIN) on the device keypad to listen to their messages. Some voicemail systems allow accessing the voicemail box from a separate device not associated with the phone number of the user's voicemail account. After listening to the voicemail message, the user may opt to delete or save the voicemail message.

In some instances, the voicemail box may be provisioned in a separate operation shortly after cellular service is provisioned on a mobile communication device for a subscriber account rather than in the same transaction when provisioning cellular service to the mobile communication device. The service provider may maintain a voicemail account for the user separate from the user's wireless communication service subscriber account, where a change made to the wireless communication service subscriber account may result in terminating and re-provisioning the voicemail account in order to reflect the changes. Existing voicemail system technology may tie a user's voicemail account to some other system or directory of the service provider, such as a billing system, and incorporate references to some combination of the user's phone number, an identifier of the mobile communication device (e.g., an international mobile equipment identifier (IMEI), a mobile equipment identifier (MEID), and/or an equipment serial number (ESN)) on which the user receives cellular service, and the user's cellular plan.

User voicemail functionality can be interrupted or voicemails be lost undesirably in a variety of different scenarios. Changing something in the user's wireless communication service subscriber account may result in unintentionally deleting voicemails and/or causing the loss of access to the voicemail feature. For example, a user may lose their mobile communication device, purchase a new mobile communication device, change service plans, or otherwise make a change to their wireless communication service subscriber account that affects their voicemail account. If a user upgrades their service plan to allow more data usage, the service provider may process the change to the user's wireless communication service subscriber account as a transaction where the user's existing voicemail account is temporarily terminated followed by re-provisioning a voicemail account to the new device or the new service plan. The termination and re-provisioning may cause an interruption in voicemail services and sometimes the user may lose saved voicemail messages during the process. Errors may arise during the re-provisioning of voicemail where the user may completely lose access to voicemail until the error is resolved. Parties calling the user may be unable to leave voicemails because the user's voicemail box is unavailable. Losing voicemail functions and deletion of saved voicemails may be frustrating for the user. Deleted voicemails may be difficult, and sometimes may be impossible, to recover. Trying to troubleshoot and resolve the issue may be time consuming for the user. There may be situations where the user does not realize their voicemail box has become inoperative because the mobile communication device may still be receiving phone calls as normal.

The present disclosure teaches a system and methods of provisioning a voicemail account according to a subscriber's identity independent from the subscriber's phone number, mobile communication device hardware identifiers, and/or service plan. Existing voicemail technology links a user's voicemail box with a combination of the user's phone number, a mobile communication device serial number (e.g., IMEI, MEID, ESN, etc.), and the user's cellular service plan, where if the user desires to change some aspect of service, a computer system managed by the service provider may be triggered to terminate and re-provision the user's voicemail account. During this termination and re-provisioning process, the risk of an unintended disruption to the voicemail account may occur. The voicemail provisioning system taught in the present disclosure assigns a voicemail account identifier based on the identity of the user, which may involve linking the voicemail account identifier to a subscriber identifier. Establishing a separate voicemail account associated with the identity of a specific user allows the user to make changes to their wireless communication service subscriber account, such as changing service plans or purchasing a new mobile communication device without risking the loss of voicemail service whenever these changes are made. The voicemail provisioning system of the present disclosure allows the user's existing voicemail account to continue providing voicemail functions on the voicemail system if the user desires to change a feature of their wireless communication service subscriber account that, with existing technology, may affect their ability to access their voicemail box, such as upgrading to a different mobile communication device, changing service plans, changing a phone number, where the service provider may implement the desired change without terminating and re-initializing the voicemail account, thereby allowing the service provider to maintain the user's voicemail account without risking the inconvenience of disrupting voicemail service.

In an embodiment, a user may sign up to receive cellular service on a network of a service provider. The user may be a new subscriber to the service provider or an existing subscriber seeking an upgrade or downgrade in cellular service. A computer system managed by the service provider may create or update an existing subscriber account for the user. A voicemail account provisioning application executing on a computer server on the service provider's network may also create a separate voicemail account for the subscriber on a voicemail system managed by the service provider. The provisioning application may assign a voicemail account identifier that provides a means of referencing the subscriber's voicemail account by the voicemail system. The subscriber account may include the voicemail account identifier and include a variety of other information about the subscriber. Some of the information may be provided by the subscriber. For example, the subscriber may provide a first name, a last name, an address, a date of birth, and a social security number that may be input to the subscriber account. Some of the information on the subscriber account may be created and used internally by the service provider to track and manage the millions or tens of millions of subscriber accounts. In an embodiment, the service provider may assign a plurality of identifiers to a subscriber, such as a subscriber identifier for general identification purposes, billing account number for billing purposes, and a voicemail account identifier for voicemail purposes. Each identifier of the plurality of identifiers may comprise unique strings of numeric or alphanumeric characters used by the service provider to differentiate and identify unique customers. The subscriber identifier may be associated with the identity of the subscriber, so that the service provider may index the hundreds of thousands or millions of different subscribers on their network. In an embodiment, a subscriber may have more than one subscriber account, wherein each subscriber account may comprise the same subscriber identifier to reference the identity of that subscriber. The voicemail account identifier may be linked to the identity of the subscriber, which may involve linking the voicemail account identifier to a subscriber identifier of the subscriber account.

A voicemail system on the network may use the voicemail account identifier to index the voicemail account and one or more voicemail boxes of each subscriber on the voicemail system. In an embodiment, the voicemail account identifier may be included in and referenced by other systems (e.g., the billing system) to account for the subscriber's voicemail account. In an embodiment, when the user receives an incoming call and doesn't answer the call or rejects the call, the calling party may be forwarded to the voicemail system server and prompted to leave a message at the voicemail box identified by the user's voicemail account identifier.

In an embodiment, a user may receive cellular service on more than one phone number, for example, one phone number may be used for personal communications and another phone number may be used for business related communications. The user may have more than one mobile communication device, where each mobile communication device is configured to receive cellular service at a different phone number. Alternatively, the user may use a mobile communication device that may support more than one phone number, such as a mobile communication device that supports multi-SIM or dual SIM operation. A multi-SIM mobile communication device may comprise hardware and software components that allows the device to maintain more than one SIM card, where each SIM card may be established to receive cellular network services on its own phone number, so that the user is not burdened with carrying multiple devices. The user may make or receive calls and send or receive messages on either phone number on the same device. Each SIM card may receive service from the same cellular provider or different cellular providers. The dual SIM mobile communication device may be configured to dynamically switch between the different phone numbers depending on the incoming and outgoing communication, or the user may manually alternate which phone number is active at a given time. Alternatively, the mobile communication device may have an embedded universal integrated circuit card (eUICC) that supports switching between different eSIM profiles. The eUICC may store a plurality of eSIM profiles, where each eSIM profile is associated with a different phone number. The mobile communication device may command the eUICC to deactivate a first eSIM profile and activate a second eSIM profile, where each eSIM profile defines a plurality of data artifacts (e.g., network access keys, encryption keys, preferred roaming lists (PRLs), applications, etc.) that support communication between the mobile communication device with cells sites and the network.

In an embodiment, the user may have more than one phone number that receives cellular service on the service provider's network. Each phone number may be associated with its own subscriber account, and each subscriber account may use the same subscriber identifier to identify the subscriber. Each phone number may have its own voicemail box, and the voicemail box for each phone number may be routed to the same voicemail account. In an embodiment, the user's voicemail account may receive voicemail messages from more than one voicemail box, where each voicemail box stores messages from different phone numbers. For example, the voicemail account may have voicemail messages on one voicemail box associated with a business phone number and may also have voicemail messages on a second voicemail box associated with a personal phone number. Routing each voicemail box to the same voicemail account allows the user a more streamlined process for checking their voicemail messages, where the user may check the voicemail messages for all the phone numbers at one place, eliminating the need to check each voicemail box in separate calls. In an embodiment, the user's voicemail account may be configured to have more than one voicemail box, where each voicemail box may be associated with a phone number on which the user receives cellular communication. Each voicemail box may be associated with the same voicemail account identifier, wherein the voicemail account identifier references a single subscriber. The identity of the subscriber may be referenced by a subscriber identifier of a subscriber account.

In an embodiment, a user may decide to add a phone number to an existing service plan. For example, the user may desire to add a second phone number for business purposes to an existing plan that the user established for personal purposes. The user may have an existing voicemail account identifier associated with a voicemail account for the existing phone number. The new phone number may associated with the identity of the subscriber, which may be referenced by the subscriber identifier. The provisioning application may initialize a voicemail box for the new phone number under the existing voicemail account, where the new voicemail box may be referenced by the same voicemail account identifier.

In an embodiment, the user may decide to delete a phone number from their account or decide to terminate service with the service provider entirely (e.g., switching to a different service provider). Terminating service or deleting a phone number may trigger the service provider to delete or archive the subscriber identifier associated with the identity of the subscriber. In an embodiment, deleting or archiving the subscriber identifier may not directly affect the user's voicemail account. The provisioning application may periodically evaluate the voicemail accounts to determine whether each voicemail account is associated with an active subscriber identifier. If a subscriber terminates their service plan, the voicemail account may erase references to the subscriber identifier(s) or may label the subscriber identifier to have expired or otherwise be in an inactive state. If the provisioning application determines that there has not been a subscriber identifier associated with the voicemail account for a certain period of time, such as for 30 days, 90 days, 120 days, 180 days or any other period of time, the provisioning application may delete the voicemail account. The provisioning application may perform the evaluation once a day, once a week, once every two weeks, once a month, or some other period of time.

After deleting a phone number or terminating service with the service provider, the user may have a change of heart and want to add back the phone number or return to the service provider. If the user adds back the phone number or returns to the service provider within the period of time before the voicemail account is deleted, the voicemail account may be restored with the subscriber identifier, as if the user had never deleted the phone number or terminated service. For example, if the voicemail account is deleted after 90 days of having no active subscriber identifier, and the user returns to service 70 days after terminating their plan (or some other period of time within the 90 days), their previous voicemail account may be restored based on the reactivation of their subscriber identifier. The user may access any saved voicemail messages and use the voicemail boxes associated with their subscriber account from before the user cancelled service.

Turning now to FIG. 1, a voicemail provisioning system 100 is described. In an embodiment, the system 100 comprises a network 102, a cell site 104, a plurality of user equipment (UE) 106, and a voicemail provisioning server 108. A UE 106 may be a cell phone, a mobile phone, a smart phone, a personal digital assistant (PDA), an Internet of things (IoT) device, a wearable computer, a headset computer, a laptop computer, a tablet computer, or a notebook computer. In some embodiments, the UE 106 may be referred to as a mobile communication device 106. The network 102 may be one or more private networks, one or more public networks, or a combination thereof. The cell site 104 provides wireless communication links to the mobile communication device 106 according to a 5G, a long-term evolution (LTE), a code division multiple access (CDMA), or a global system for mobile communications (GSM) wireless telecommunication protocol. In an embodiment, a service provider may provide cellular service to the mobile communication device 106.

The system 100 may further comprise a voicemail system 110 and a subscriber database 112. In an embodiment, the voicemail system 110 provides voicemail service to subscribers on the network 102. The voicemail system 110 comprises a plurality of voicemail accounts 118. There may be hundreds of thousands or millions of voicemail accounts 118 on voicemail system 110. In an embodiment, a user may subscribe to receive cellular service on a mobile communication device 106 from the service provider on the network 102. In an embodiment, the user subscribing to receive cellular service on mobile communication device 106 may be a new subscriber to the service provider. The service provider may keep track of subscribers on the subscriber database 112, where a subscriber account 124 is created for each service plan. A subscriber identifier 126 may be created and used to reference the identity of the subscriber, wherein the subscriber identifier 126 is a unique hash of numeric or alphanumeric characters. The subscriber identifier 126 may be stored in the subscriber account 124. A computer system managed by the service provider may use the subscriber identifier 126 in other systems and databases, such as a billing system, as a mechanism to keep track of and provide service to the hundreds of thousands or millions of subscribers. A phone number 128 may be assigned to the mobile communication device 106, where a reference to the phone number 128 is also stored on the subscriber account 124.

In an embodiment, the voicemail provisioning server 108 comprises a voicemail provisioning application 114. In an embodiment, upon creating a subscriber account 124 and a subscriber identifier 126, a request may be sent to the voicemail provisioning application 114 to create a voicemail account 118 for the subscriber account 124. The voicemail provisioning application 114 may determine that a voicemail account identifier 116 has not been previously generated for the subscriber identifier 126 and generate the voicemail account identifier 116. The voicemail provisioning application 114 may initialize the voicemail account 118 with a voicemail box 120 and assign the voicemail account identifier 116 to the voicemail account 118. After initializing the voicemail account 118, the voicemail provisioning application 114 may transmit the voicemail account 118 and voicemail account identifier 116 to the voicemail system 110. The voicemail account identifier 116 may be used by the voicemail system 110 to index and categorize the plurality of voicemail accounts 118 on the voicemail system 110. The voicemail account identifier 116 may be a unique string of characters generated by the voicemail provisioning application 114 that is associated with an identity of the subscriber via the subscriber identifier 126. The subscriber account 124 may incorporate a reference to the voicemail account identifier 116 for recordkeeping purposes. In an embodiment, if the user changes an aspect of their service plan or information on their subscriber account 124, the voicemail account identifier 116 remains unaffected. For example, the user may lose a mobile communication device 106, purchase a new mobile communication device 106, upgrade or downgrade their service plan, change their phone number 128, or make some other change to their subscriber account 124. The voicemail account 118 associated with the voicemail account identifier 116 may remain on the voicemail system 110 when any changes are made to the subscriber account 124.

In an embodiment, other mobile communication devices 106 may call the mobile communication device 106 by using the phone number 128. In an embodiment, the user may not answer the call made to the mobile communication device 106. For example, the user may be busy and reject the call or the user may miss the call for other reasons. In an embodiment, the calling party may be directed to a voicemail box 120 identified by the voicemail account identifier 116 and prompted to leave an audio message recording. The audio message may be stored in the voicemail box 120. The user of the mobile communication device 106 may access the voicemail account 118 associated with the voicemail account identifier 116 and listen to the voicemail message stored in voicemail box 120. More than one message may be stored in the voicemail box 120 at the same time, and the user may save or delete the voicemail messages in voicemail box 120.

In an embodiment, more than one phone number 128 may be configured to the same mobile communication device 106. For example, the mobile communication device 106 may have hardware and software components to support multi-SIM operation. The multi-SIM operation may support a combination of micro-SIM, nano-SIM, or embedded-SIM (eSIM). Alternatively, the mobile communication device 106 may have an embedded universal integrated circuit card (eUICC) that supports switching between different eSIM profiles, wherein each eSIM profile is associated with a different phone number. In an embodiment, the user may use more than one mobile communication device 106, wherein each mobile communication device 106 receives cellular service from a different phone number 128. For example, the user may use a first mobile communication device 106 associated with a first phone number 128 for personal purposes and a second mobile communication device 106 associated with a second phone number 128 for business purposes. A separate subscriber account 124 may be created for the first phone number 128 and the second phone number 128, where each subscriber account 124 comprises the same subscriber identifier 126. A voicemail account 118 and a voicemail account identifier 116 may already exist on the voicemail server 110 for the subscriber identifier 126 associated with the first phone number 128. In an embodiment, the voicemail provisioning application 114 receives a request to create a voicemail account 118 for the second phone number 128 associated with the subscriber identifier 126. The voicemail provisioning application 114 may determine that a voicemail account 118 and voicemail account identifier 116 associated with the subscriber identifier 126 already exists on the voicemail system 110. Instead of creating a new voicemail account 118, the voicemail provisioning application 114 may create a second voicemail box 122 for the second phone number 128 and transmit the second voicemail box 122 to the voicemail account 118 on the voicemail system 110, where the second voicemail box 122 is associated with the same voicemail account identifier 116. The first voicemail box 120 may store voicemail messages for the first phone number 128, and the second voicemail box 122 may store voicemail messages for the second phone number 128. There may be any number of voicemail boxes associated with any number of phone numbers 128 on a voicemail account 118. The user may listen to the voicemail messages on both the first voicemail box 120 and the second voicemail box 122 in the same operation when checking for voicemail messages.

In an embodiment, the user may desire to delete a phone number 128. In an embodiment, the user may desire to terminate cellular service with the service provider. A computer system managed by the service provider may delete or archive the subscriber account 124 that the user desires to terminate. Deleting the subscriber account 124 may cause the subscriber identifier 126 to also be deleted. Even though the subscriber account 124 has been terminated, the voicemail account 118 associated with the subscriber account 124 may remain on the voicemail system 110 for a predefined period of time. The voicemail provisioning application 114 may periodically evaluate the voicemail account 118 to determine whether the subscriber identifier 126 associated with the voicemail account 118 has been deleted or otherwise rendered inactive. For example, the voicemail account 118 may remain on the voicemail system 110 for 30 days, 90 days, 120 days, 180 days or any other period of time without an associated active subscriber identifier 126 before the voicemail provisioning application 114 deletes the voicemail account 118. The voicemail provisioning application 114 may perform the evaluation once a day, once a week, once every two weeks, once a month, once a quarter, or some other period of time. If the user changes their mind within the period of time before their voicemail account 118 is deleted and decides to return to the service provider, the voicemail account 118 associated with the voicemail account identifier 116 may be re-established on the user's subscriber account 124.

Figure 2:
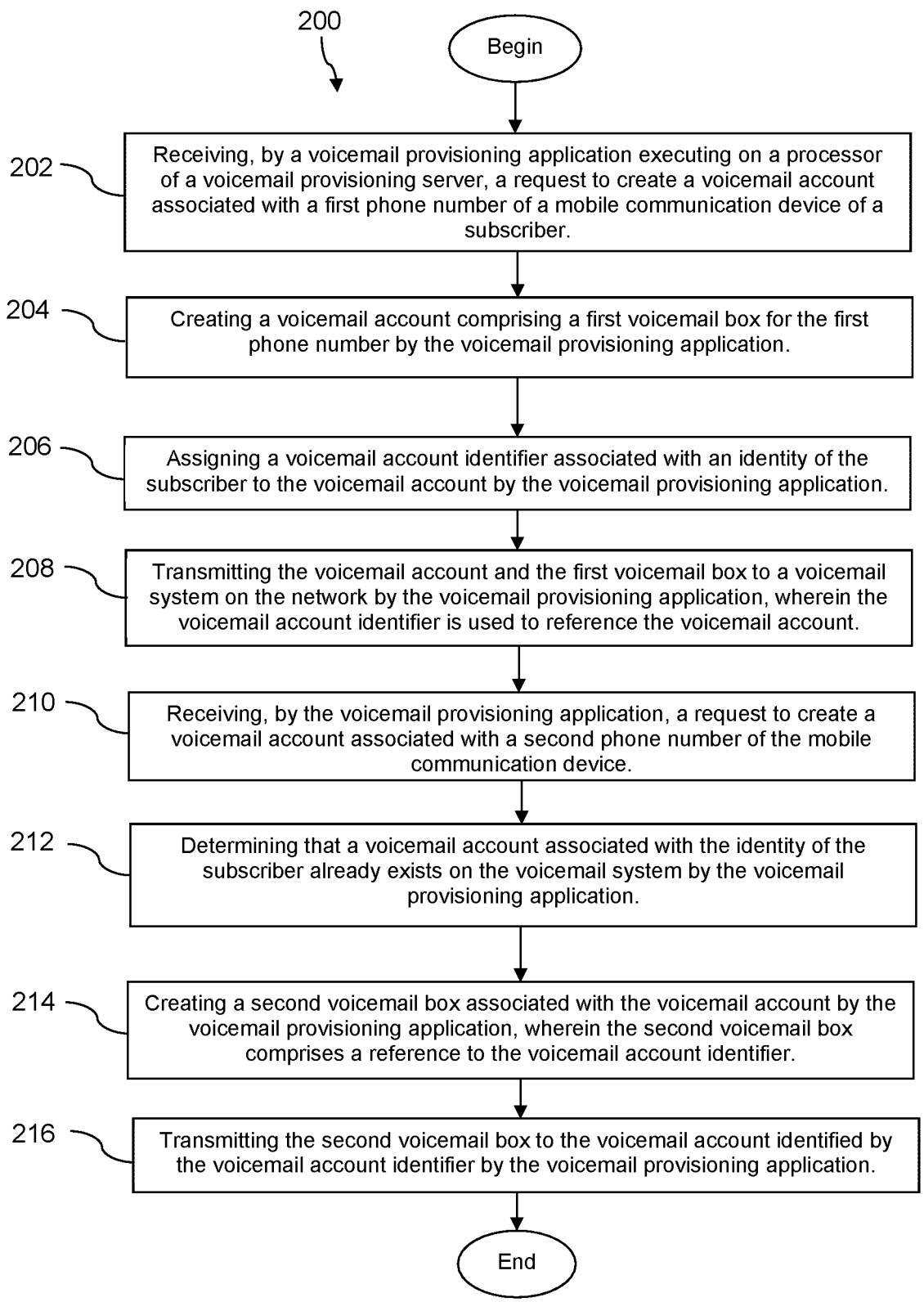
FIG. 2 is a flowchart of a method according to an embodiment of the disclosure.

Turning now to FIG. 2, a method 200 is described. In an embodiment, method 200 is a method of provisioning voicemail service to a mobile communication device. At block 202, the method 200 comprises receiving, by a voicemail provisioning application executing on a processor of a voicemail provisioning server, a request to create a voicemail account associated with a first phone number of a mobile communication device of a subscriber. At block 204, the method 200 comprises creating a voicemail account comprising a first voicemail box for the first phone number by the voicemail provisioning application. At block 206, the method 200 comprises assigning a voicemail account identifier associated with an identity of the subscriber to the voicemail account by the voicemail provisioning application. At block 208, the method 200 comprises transmitting the voicemail account and the first voicemail box to a voicemail system on the network by the voicemail provisioning application, wherein the voicemail account identifier is used to reference the voicemail account.

The method 200 further comprises, at block 210, receiving, by the voicemail provisioning application, a request to create a voicemail account associated with a second phone number of the mobile communication device. At block 212, the method 200 comprises determining that a voicemail account associated with the identity of the subscriber already exists on the voicemail system by the voicemail provisioning application. At block 214, the method 200 comprises creating a second voicemail box associated with the voicemail account by the voicemail provisioning application, wherein the second voicemail box comprises a reference to the voicemail account identifier. At block 216, the method 200 comprises transmitting the second voicemail box to the voicemail account identified by the voicemail account identifier by the voicemail provisioning application.

Figure 3:
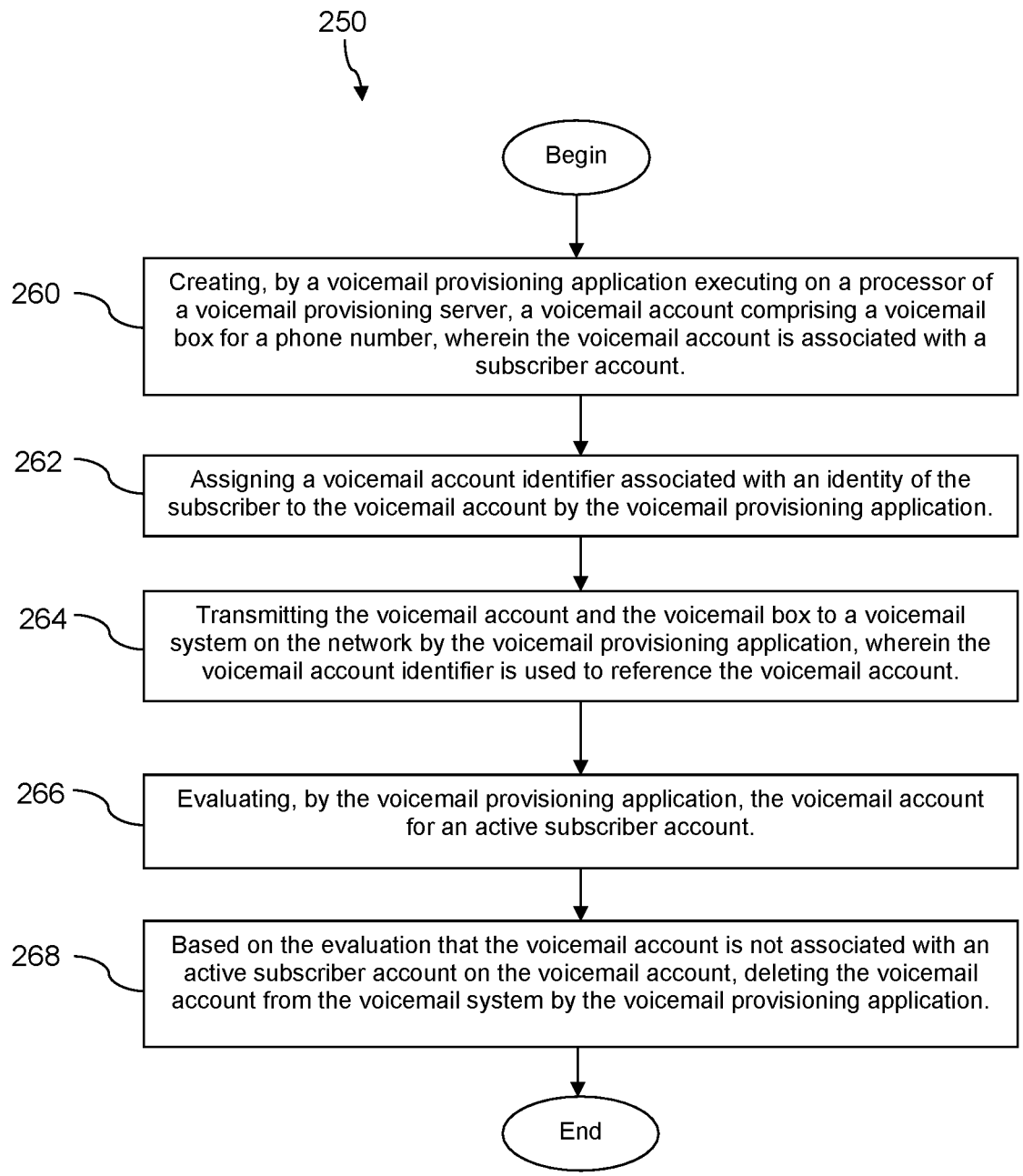
FIG. 3 is a flowchart of another method according to an embodiment of the disclosure.

Turning now to FIG. 3, a method 250 is described. In an embodiment, method 250 is a method of provisioning and managing voicemail service to a mobile communication device. The method 250 comprises, at block 260, creating, by a voicemail provisioning application executing on a processor of a voicemail provisioning server, a voicemail account comprising a voicemail box for a phone number, wherein the voicemail account is associated with a subscriber account. At block 262, the method comprises assigning a voicemail account identifier associated with an identity of the subscriber to the voicemail account by the voicemail provisioning application. At block 264, the method comprises transmitting the voicemail account and the voicemail box to a voicemail system on the network by the voicemail provisioning application, wherein the voicemail account identifier is used to reference the voicemail account. At block 266, the method comprises evaluating, by the voicemail provisioning application, the voicemail account for an active subscriber account. At block 268, the method comprises based on the evaluation that the voicemail account is not associated with an active subscriber account on the voicemail account, deleting the voicemail account from the voicemail system by the voicemail provisioning application.

Figure 4:
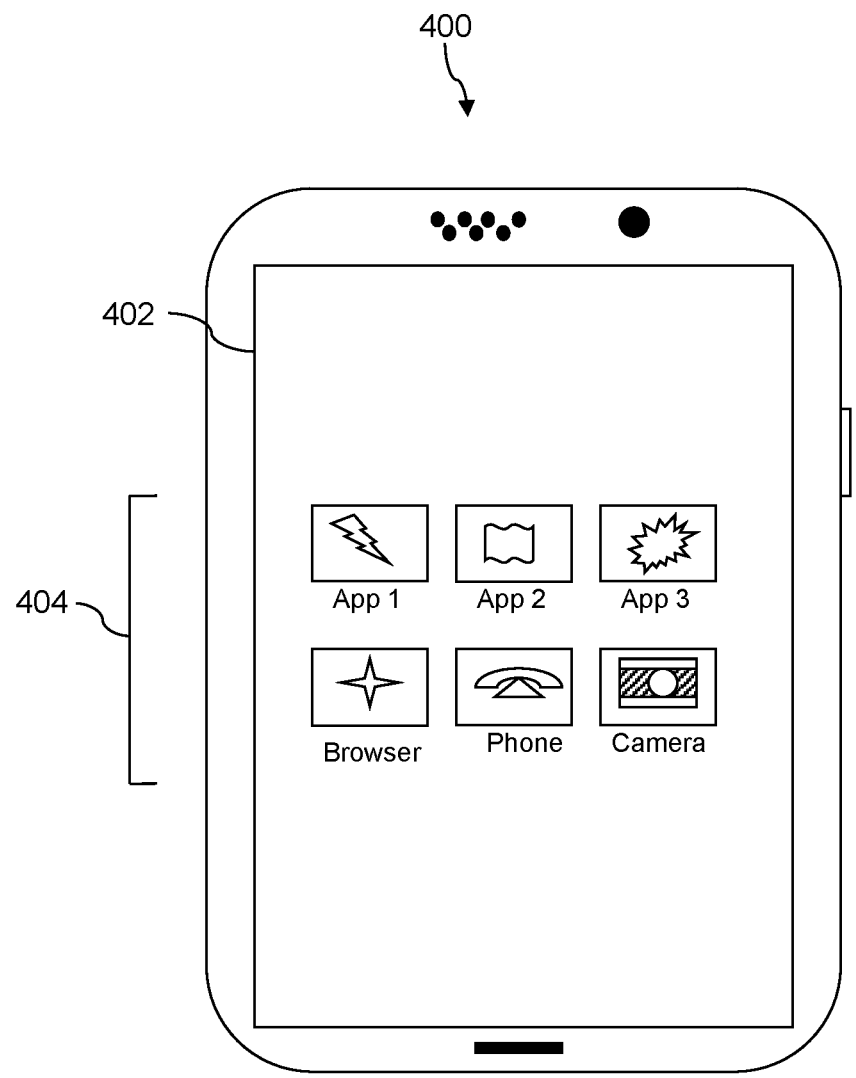
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
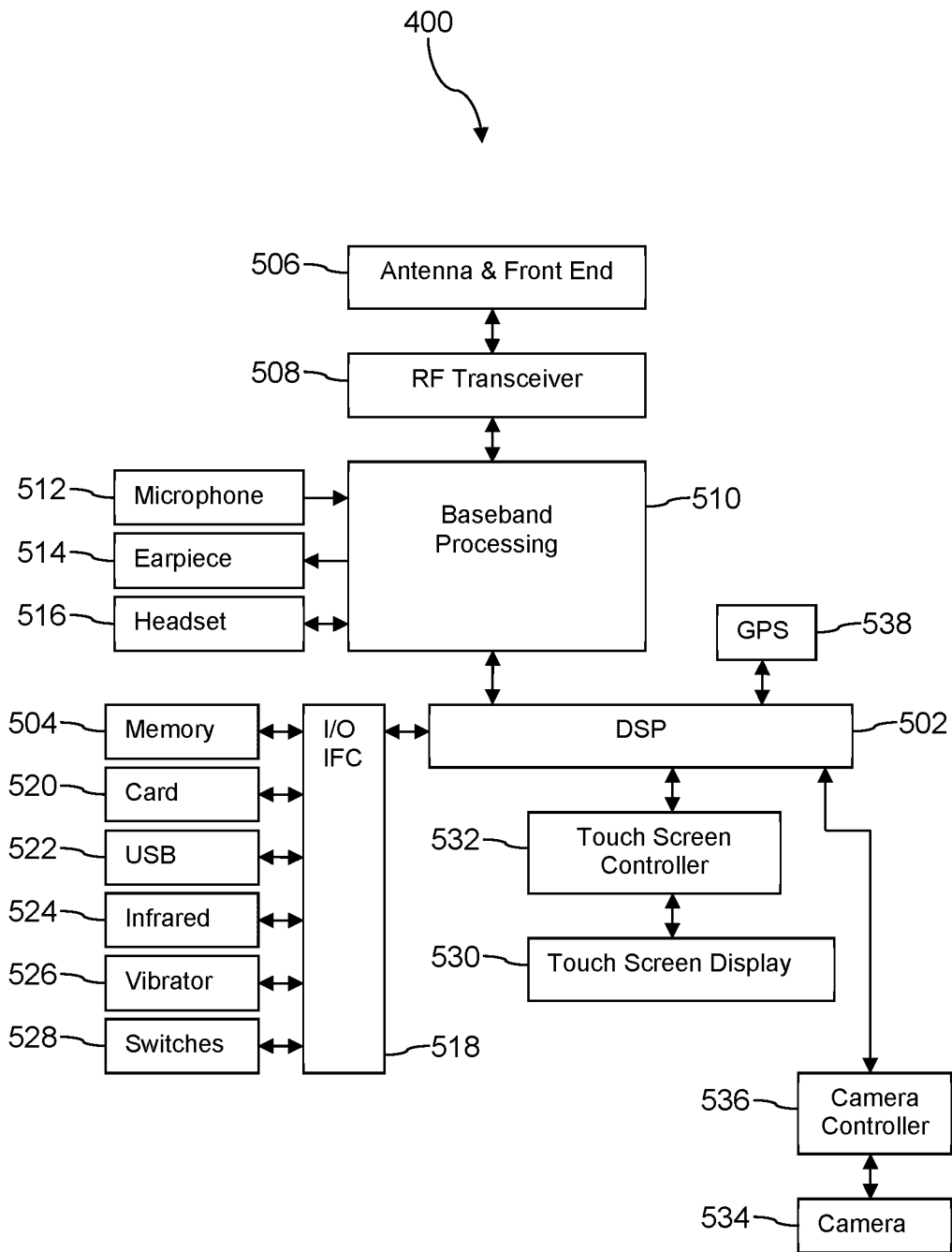
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
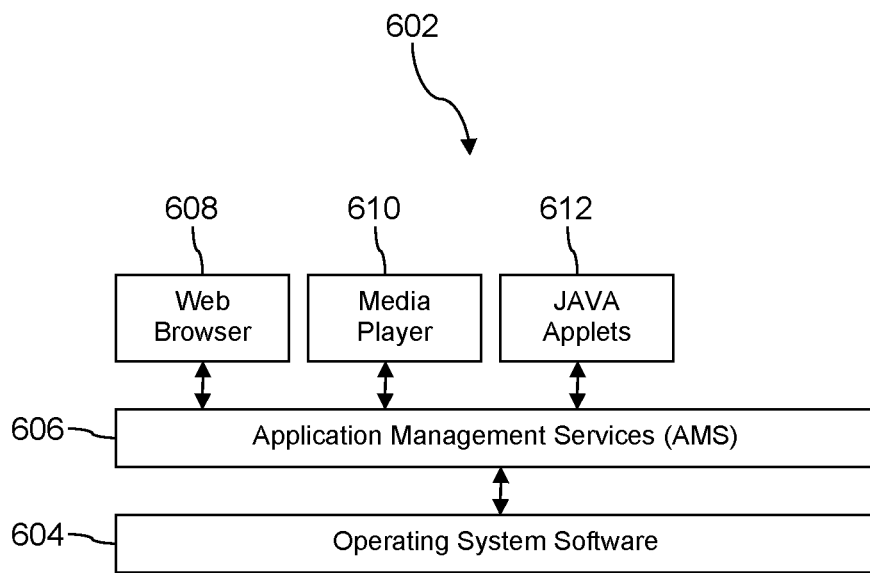
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
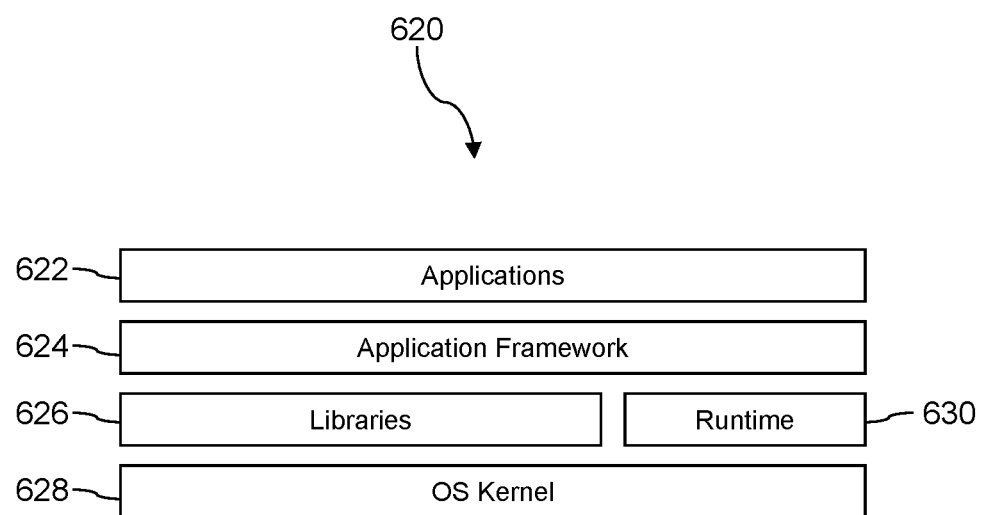
FIG. 6B is a block diagram of another software architecture of a mobile communication device according to an embodiment of the disclosure

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
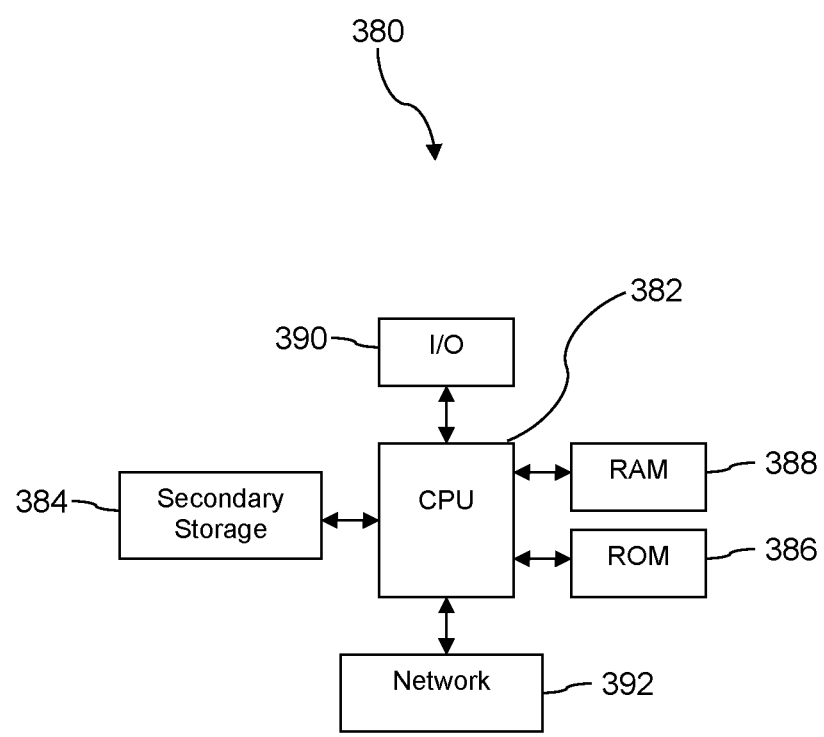
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer system for provisioning voicemail service to a mobile communication device, comprising:
   a processor;
   a non-transitory memory coupled to the processor; and
   a voicemail provisioning application stored in the non-transitory memory that, when executed by the processor:
      receives, via a first service provider network, a request from a first number of a multi-SIM or multi-SIM profile mobile communication device to create a voicemail account associated with the first phone number of the multi-SIM or multi-SIM profile mobile communication device of a subscriber,
      creates a voicemail account comprising a first voicemail box for the first phone number,
      assigns a voicemail account identifier associated with an identity of the subscriber to the voicemail account,
      transmits the voicemail account and the first voicemail box to a voicemail system on the network, wherein the voicemail account identifier is used to reference the voicemail account,
      receives, via a second service provider network, a request from a second number of the multi-SIM or multi-SIM profile mobile communication device to create a voicemail account associated with the second phone number of the multi-SIM or multi-SIM profile mobile communication device,
      determines that a voicemail account associated with the identity of the subscriber already exists on the voicemail system,
      creates a second voicemail box associated with the voicemail account, wherein the second voicemail box comprises a reference to the voicemail account identifier, and
      transmits the second voicemail box to the voicemail account identified by the voicemail account identifier, wherein the voicemail account is provisioned according to the identity of the subscriber independent from any phone number associated with the subscriber, mobile communication device hardware identifiers, and service plan.

2. The system of claim 1, wherein the multi-SIM or multi-SIM profile mobile communication device is configured for multi-SIM operation.

3. The system of claim 1, wherein the multi-SIM or multi-SIM profile mobile communication device is configured for dual-SIM operation.

4. The system of claim 2, wherein the multi-SIM operation may support a combination of micro-SIM, nano-SIM, or embedded-SIM (eSIM), wherein each SIM may be configured to receive cellular service at one phone number.

5. The system of claim 1, wherein the multi-SIM or multi-SIM profile mobile communication device is configured to support an embedded universal integrated circuit card (eUICC) comprising a plurality of eSIM profiles, wherein each eSIM profile is associated with a different phone number.

6. The system of claim 1, wherein the multi-SIM or multi-SIM profile mobile communication device is a cell phone, a mobile phone, a smart phone, an Internet of things (IoT) device, a personal digital assistant (PDA), a wearable computer, a headset computer, a laptop computer, a notebook computer, or a tablet computer.

7. The system of claim 1, wherein the multi-SIM or multi-SIM profile mobile communication device establishes a telecommunications protocol according to one of a 5G, a long-term evolution (LTE), a code division multiple access (CDMA), or a global system for mobile communications (GSM) telecommunications protocol.

8. A method of provisioning voicemail service to a mobile communication device, comprising:
   receiving, by a voicemail provisioning application executing on a processor of a voicemail provisioning server via a first service provider network, a request from a first number of a multi-SIM or multi-SIM profile mobile communication device to create a voicemail account associated with the first phone number of the multi-SIM or multi-SIM profile mobile communication device of a subscriber;
   creating a voicemail account comprising a first voicemail box for the first phone number by the voicemail provisioning application;
   assigning a voicemail account identifier associated with an identity of the subscriber to the voicemail account by the voicemail provisioning application;
   transmitting the voicemail account and the first voicemail box to a voicemail system on the network by the voicemail provisioning application, wherein the voicemail account identifier is used to reference the voicemail account;
   receiving, by the voicemail provisioning application via a second service provider network, a request from a second number of the multi-SIM or multi-SIM profile mobile communication device to create a voicemail account associated with the second phone number of the multi-SIM or multi-SIM profile mobile communication device;
   determining that a voicemail account associated with the identity of the subscriber already exists on the voicemail system by the voicemail provisioning application;
   creating a second voicemail box associated with the voicemail account by the voicemail provisioning application, wherein the second voicemail box comprises a reference to the voicemail account identifier; and
   transmitting the second voicemail box to the voicemail account identified by the voicemail account identifier by the voicemail provisioning application, wherein the voicemail account is provisioned according to the identity of the subscriber independent from any phone number associated with the subscriber, mobile communication device hardware identifiers, and service plan.

9. The method of claim 8, wherein the first phone number is associated with a mobile communication device used for personal purposes.

10. The method of claim 8, wherein the second phone number is associated with a mobile communication device used for business purposes.

11. The method of claim 8, wherein the voicemail account identifier comprises a unique string of numeric or alphanumeric characters.

12. The method of claim 8, wherein a reference to the voicemail account identifier is transmitted to the subscriber account.

13. The method of claim 12, wherein the first phone number and second phone number are associated with the identity of the subscriber, wherein the identity of the subscriber is associated with a subscriber identifier.

14. The method of claim 8, further comprising:
   evaluating, by the voicemail provisioning application, the voicemail account for an active subscriber account; and
   based on the evaluation that the voicemail account is not associated with an active subscriber account on the voicemail account, deleting the voicemail account from the voicemail system by the voicemail provisioning application.

15. The method of claim 14, wherein the voicemail provision application evaluates the voicemail account for a subscriber account that has not been active for 30 days, 90 days, 120 days, or 180 days.

16. The method of claim 14, wherein the voicemail provision application evaluates the voicemail account for an active subscriber account once a day, once a week, once every two weeks, once a month, or once a quarter.

17. The method of claim 14, wherein the multi-SIM or multi-SIM profile mobile communication device is a cell phone, a mobile phone, a smart phone, an Internet of things (IoT) device, a personal digital assistant (PDA), a wearable computer, a headset computer, a laptop computer, a notebook computer, or a tablet computer.

18. The method of claim 14, wherein the multi-SIM or multi-SIM profile mobile communication device establishes a telecommunications protocol according to one of a 5G, a long-term evolution (LTE), a code division multiple access (CDMA), or a global system for mobile communications (GSM) telecommunications protocol.

19. The system of claim 8, wherein each voicemail box stores audio messages left by a calling party, and the subscriber listens to the audio messages stored on the first voicemail box and the second voicemail box in one transaction.

* * * * *